(12) United States Patent
Schmitz et al.

(10) Patent No.: US 9,821,980 B2
(45) Date of Patent: Nov. 21, 2017

(54) QUICK CHANGE BRAKING SYSTEM

(71) Applicant: Illinois Tool Works Inc., Glenview, IL (US)

(72) Inventors: Adam Richard Schmitz, Appleton, WI (US); Chris J. Roehl, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 217 days.

(21) Appl. No.: 14/674,240

(22) Filed: Mar. 31, 2015

(65) Prior Publication Data

US 2016/0289040 A1 Oct. 6, 2016

(51) Int. Cl.
*B65H 59/38* (2006.01)
*B65H 49/36* (2006.01)
*B65H 59/04* (2006.01)
*B23K 9/133* (2006.01)

(52) U.S. Cl.
CPC ......... *B65H 59/382* (2013.01); *B23K 9/1333* (2013.01); *B65H 49/36* (2013.01); *B65H 59/04* (2013.01); *B65H 2701/36* (2013.01)

(58) Field of Classification Search
CPC ...... B65H 49/36; B65H 59/382; B65H 59/04; B65H 2701/36; B23K 9/1333
See application file for complete search history.

(56) References Cited

U.S. PATENT DOCUMENTS

| 5,343,899 | A | 9/1994 | Jacobsson et al. |
| 7,977,604 | B2 | 7/2011 | Ertmer |
| 2004/0200819 | A1 | 10/2004 | Kensrue |
| 2009/0236462 | A1 | 9/2009 | Burns |

OTHER PUBLICATIONS

International Search Report and Written Opinion for corresponding International Patent Application No. PCT/US2016/015304 dated May 11, 2016, 10 pages.
Millermatic 212 Auto-Set, Issued Jan. 2013, Index No. DC/12.46, 8 pages.
Millermatic 252, Issued Apr. 2013, Index No. DC/12.49, 8 pages.
Millermatic 350P, Issued Feb. 2015, Index No. DC/12.51, 4 pages.
Millermatic 350P, Issued Jul. 2012, Index No. DC/12.56, 4 pages.

*Primary Examiner* — William E Dondero
(74) *Attorney, Agent, or Firm* — Klintworth & Rozenblat IP LLP

(57) ABSTRACT

A braking system for a welding machine is provided. In one aspect, the braking system includes a brake surface, a spool hub shaft, a spool hub, an adjustment knob and an expandable and compressible member. The spool hub shaft is capable of engaging against the brake surface. The expandable and compressible member is provided between the spool hub and the adjustment knob to apply varying levels of force on the spool hub. The spool hub shaft has at least one tab which is capable of engaging with a recess in the adjustment knob to adjust the force applied by the member on the spool hub.

20 Claims, 9 Drawing Sheets

QUICK CHANGE BRAKING SYSTEM

FIELD OF THE DISCLOSURE

The present disclosure relates generally to a quick change braking system for a welding machine.

BACKGROUND

Conventional spool hub systems for welding machines include a braking system which prevents the spool of wire from overspooling inside the welding machine. These systems vary from electronic brakes to simple brake washers with a spring force applied to the brake washer.

Conventional welding machines which use spring-based brake washers have a nut which is threaded onto an end of a threaded spool hub shaft. An example of such a conventional welding machine 10 is shown in FIGS. 1 and 2. The spring 12 is between the nut 14 and a spool hub 16 mounted on the spool hub shaft 18. The nut 14 is tightened on the spool hub shaft 18 to adjust the pressure of the spring 12 on the spool hub 16 which, in turn, adjusts the pressure of the spool hub 16 bearing against the brake washer 20. Sometimes, the nut 14 appears to be loose to the user, and upon seeing this, the user may tighten the nut 14 to what they "feel" is the correct amount of torque, since the threaded connection between the nut 14 and the spool hub 16 allows an infinite range of torque adjustment (subject to the length of the thread). Sometimes, this new torque is too tight and prevents the spool hub 16 from spinning on the spool hub shaft 18 as the spool hub 16 is bound too tightly between the spring 12 and the brake washer 20. Also sometimes, the user does not apply sufficient tension, which could allow the wire spool 22 to overspool.

SUMMARY

In one aspect, a braking system for a welding machine is provided. The braking system includes, but is not limited to, a brake surface, a spool hub shaft, a spool hub, an adjustment knob and an expandable and compressible member. The spool hub shaft is capable of engaging against the brake surface. The expandable and compressible member is provided between the spool hub and the adjustment knob to apply varying levels of force on the spool hub. The spool hub shaft has at least one tab which is capable of engaging with a recess in the adjustment knob to adjust the force applied by the member on the spool hub.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
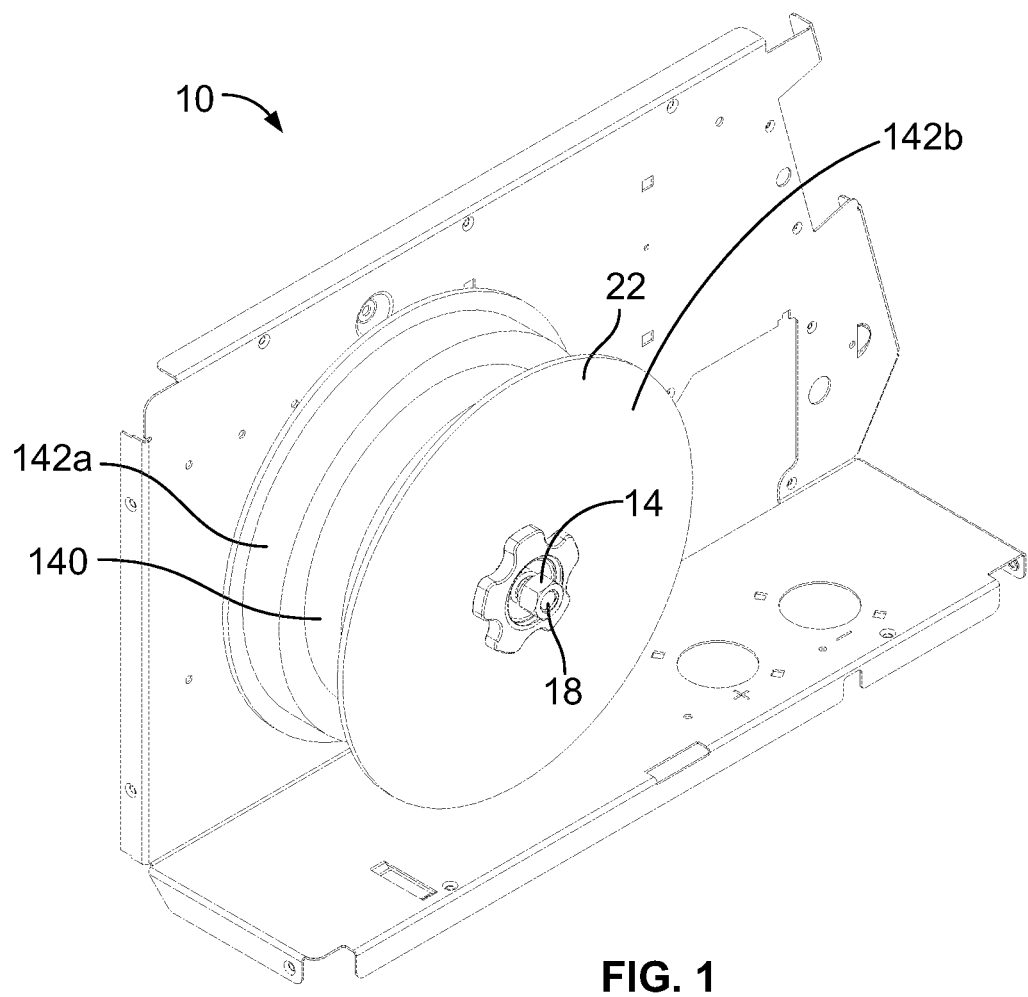
FIG. 1 depicts a perspective view of a conventional braking system for a welding machine.
Figure 2:
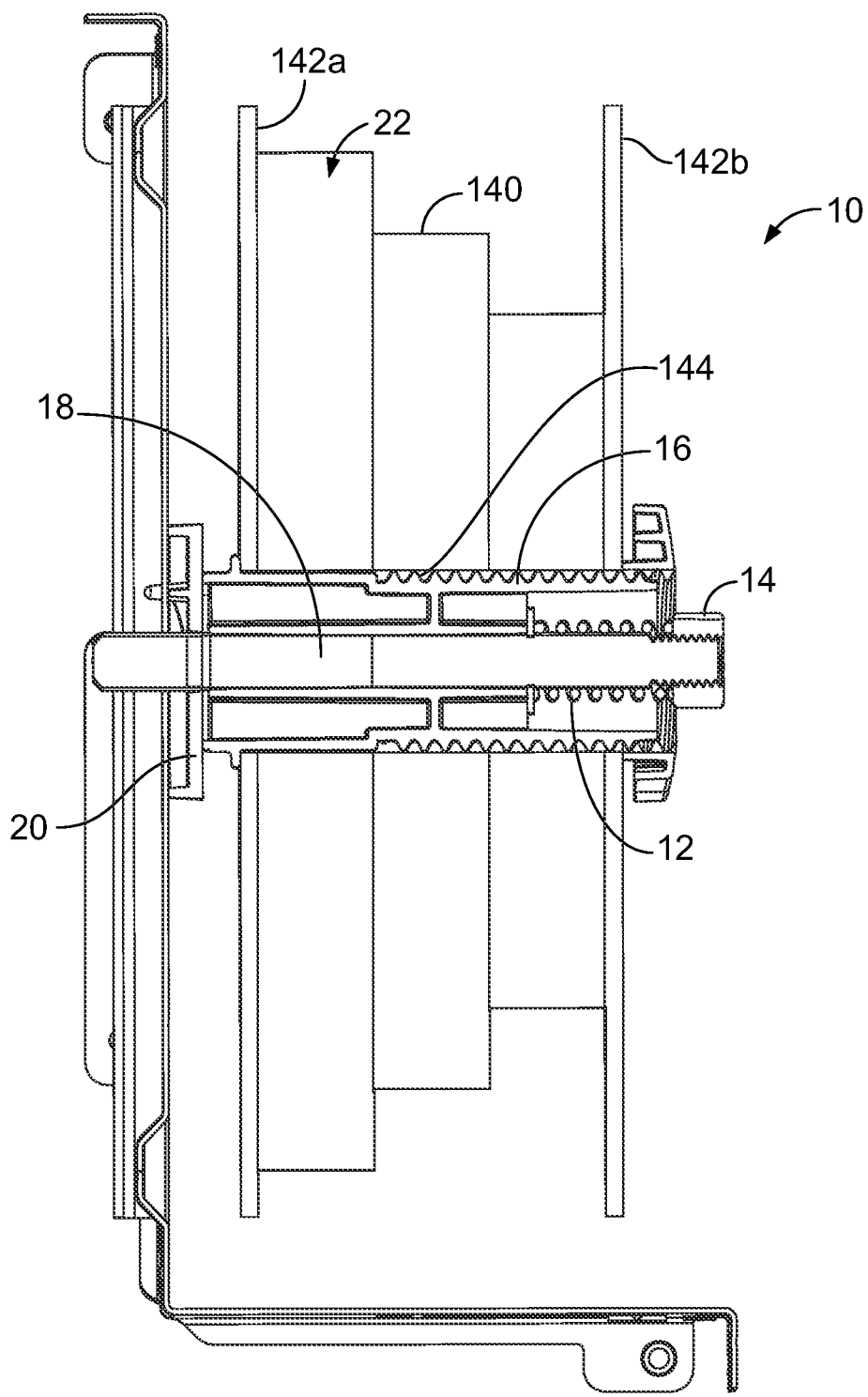
FIG. 2 is a cross-sectional view of the braking system of FIG. 1.

While the disclosure may be susceptible to embodiment in different forms, there is shown in the drawings, and herein will be described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity.

Figure 3:
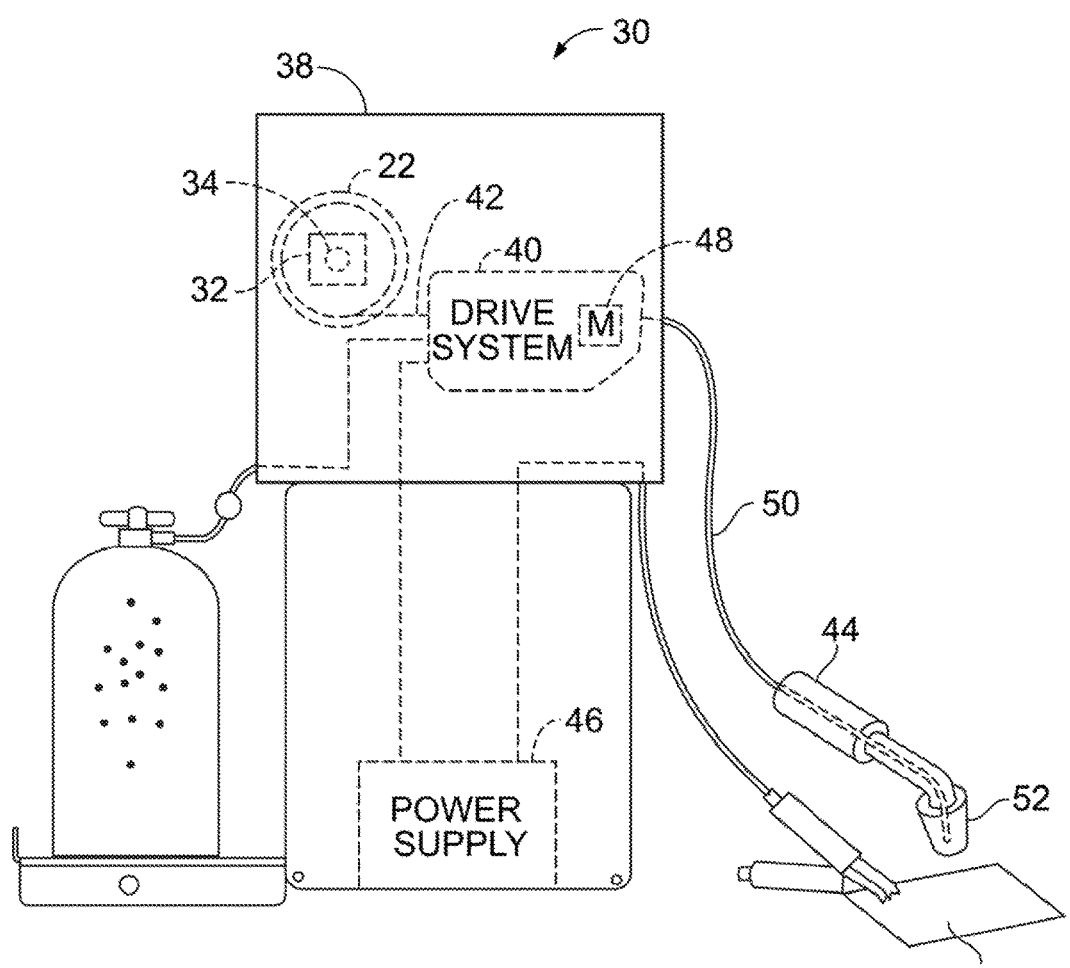
FIG. 3 depicts a schematic view of a welding machine in accordance with an embodiment of the present disclosure.
Figure 4:
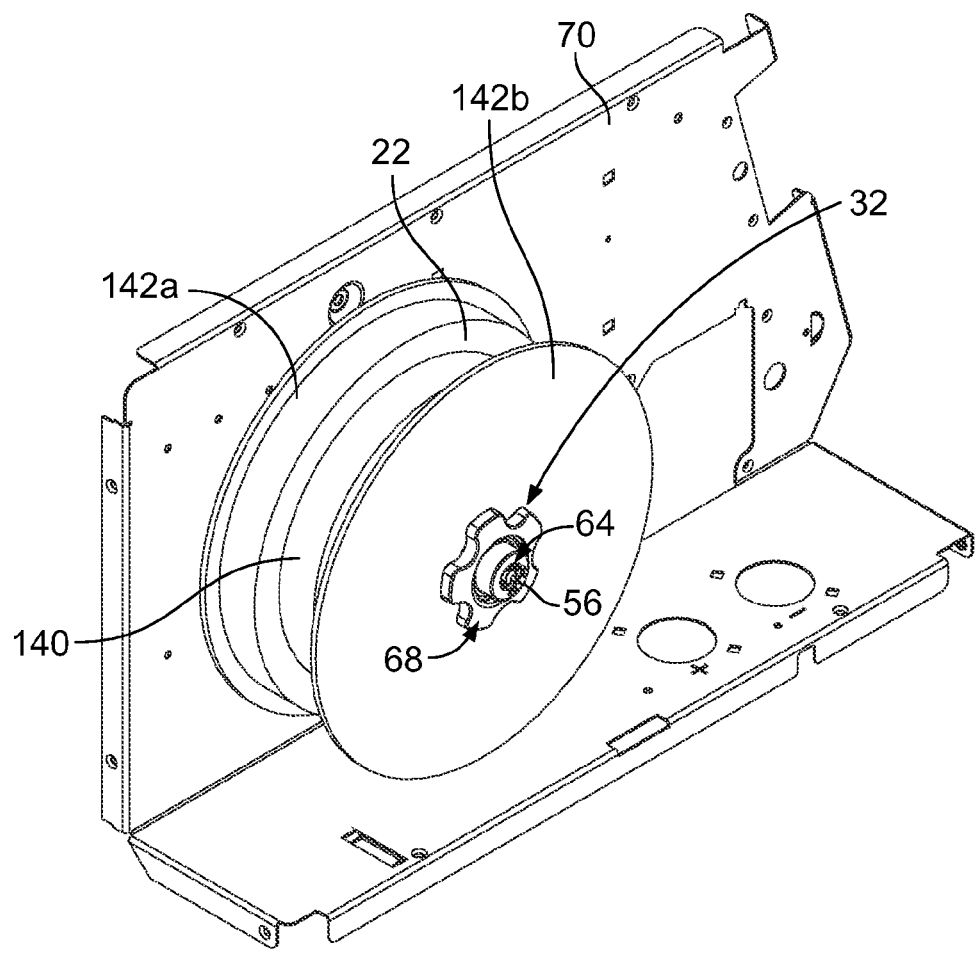
FIG. 4 depicts a perspective view of a quick change braking system in accordance with an embodiment of the present disclosure mounted on the welding machine and having a spool of wire mounted thereon.
Figure 5:
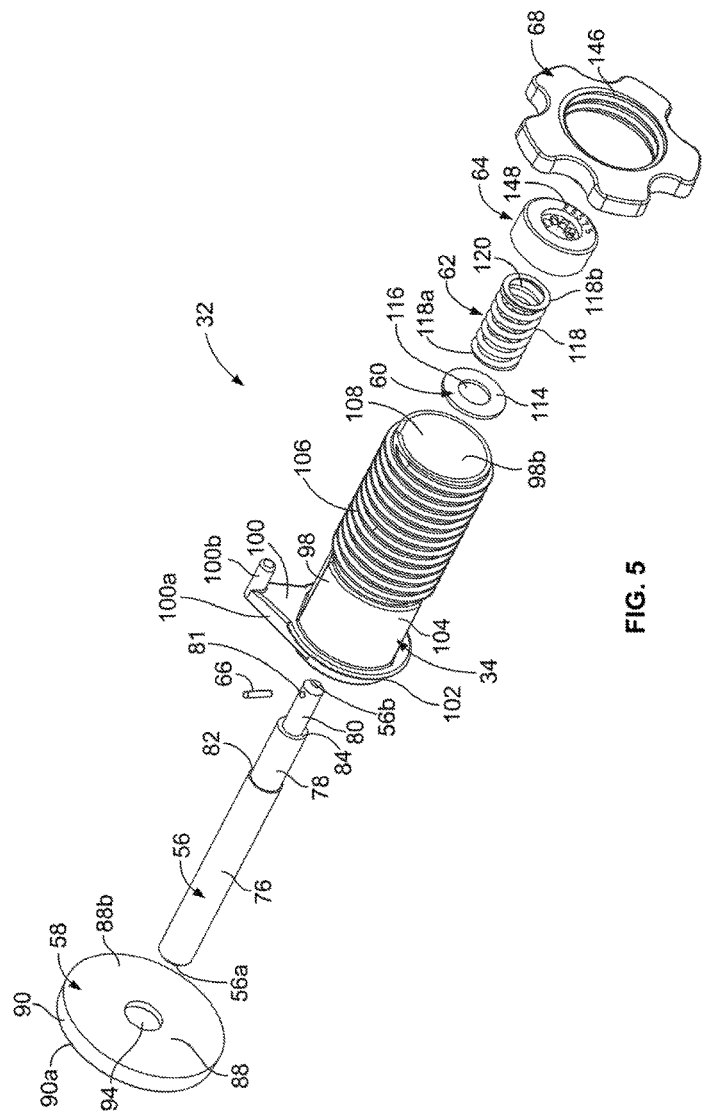
FIG. 5 is an exploded perspective view of the braking system of FIG. 4.
Figure 6:
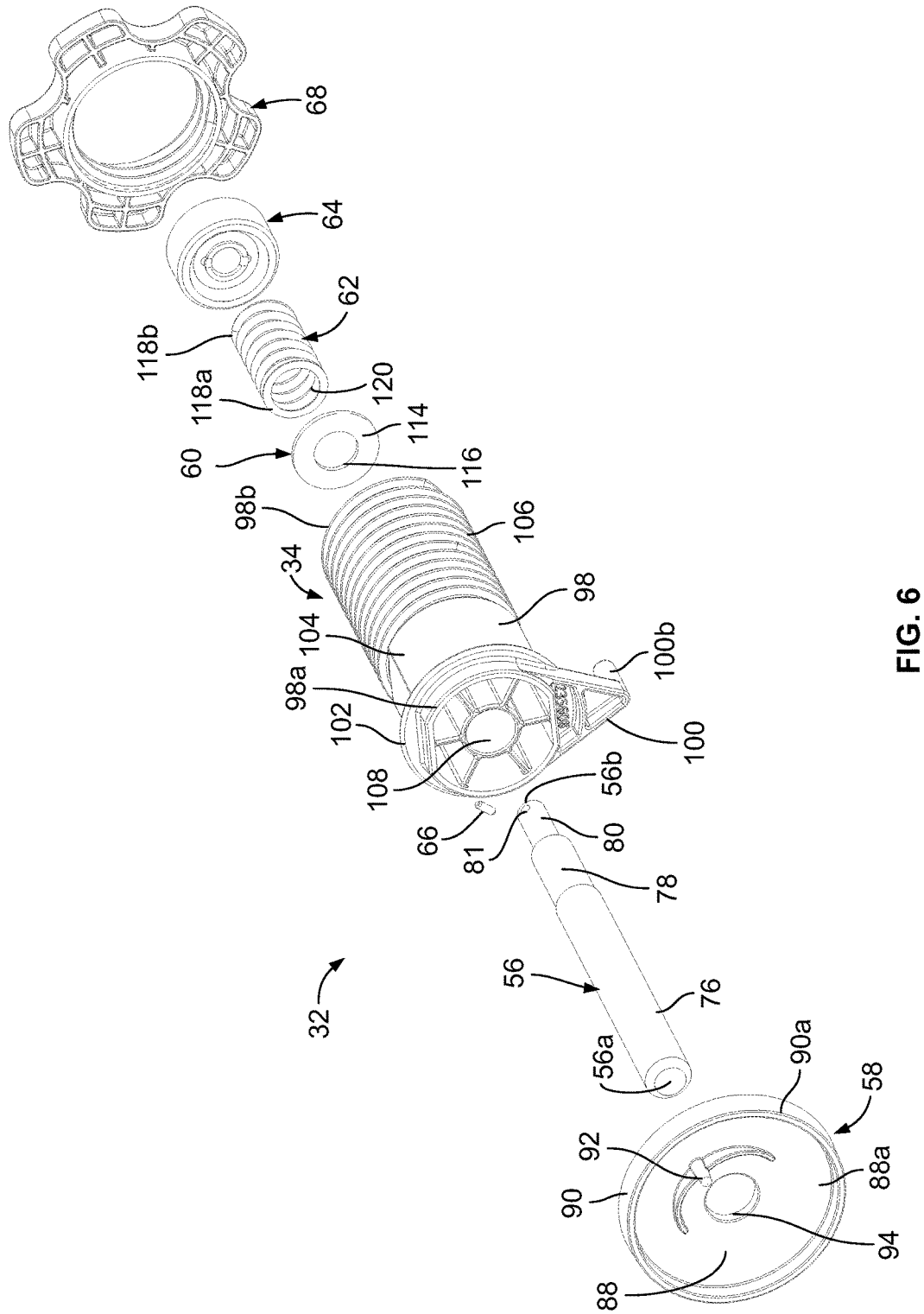
FIG. 6 is an alternate exploded perspective view of the braking system of FIG. 4.
Figure 7:
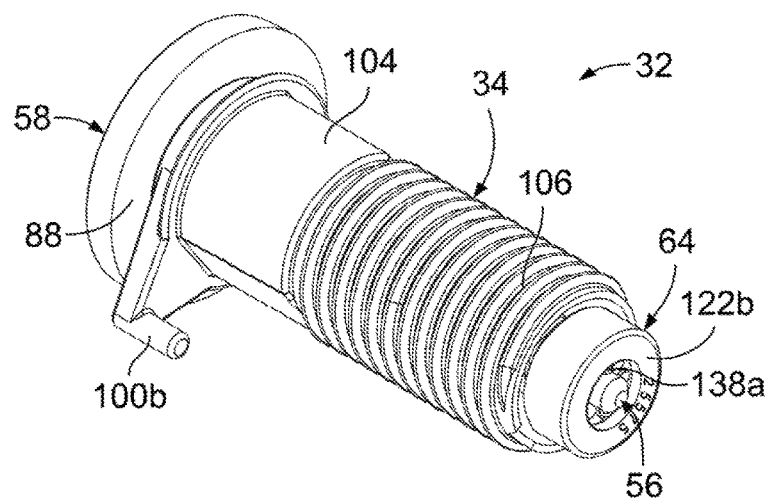
FIG. 7 is an enlarged perspective view of the braking system of FIG. 4.
Figure 8:
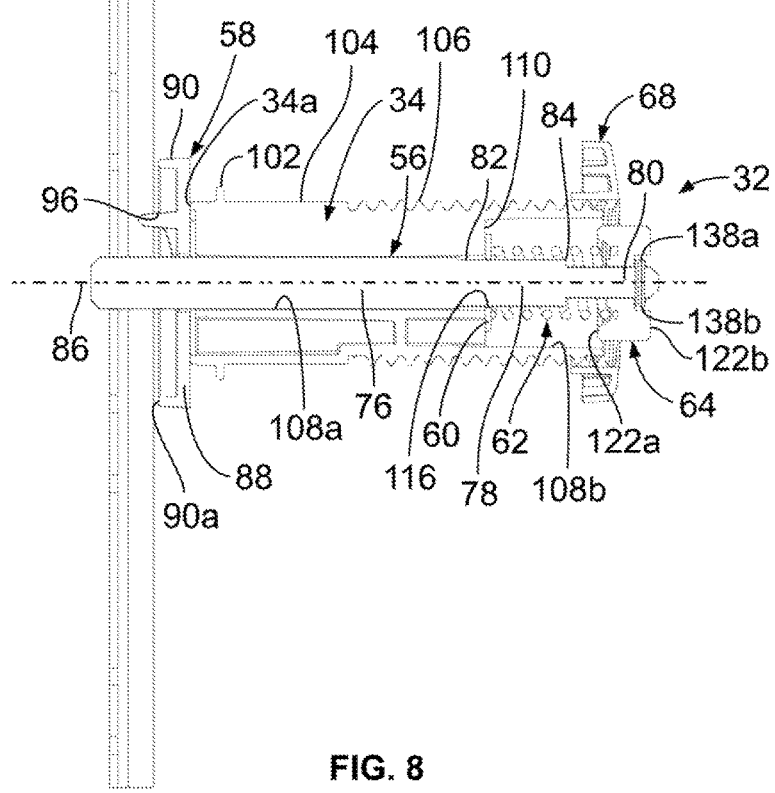
FIG. 8 is a cross-sectional view of the braking system of FIG. 4.
Figure 9:
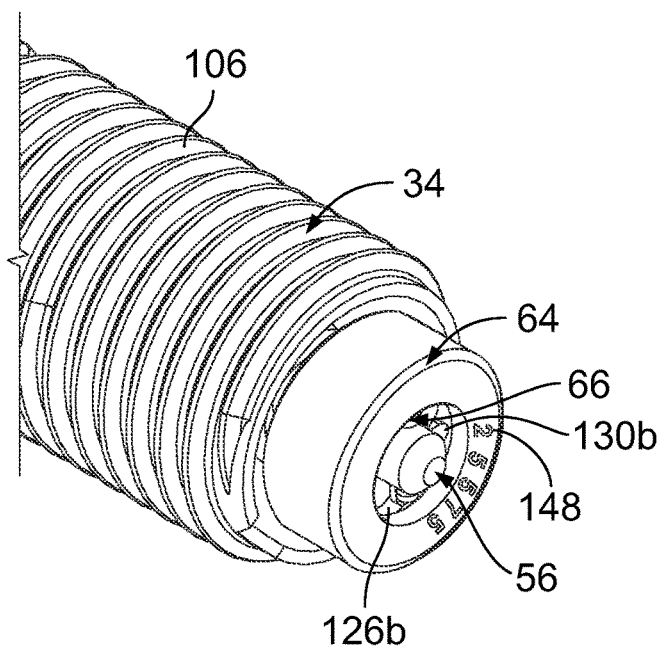
FIG. 9 is an enlarged perspective view of components of the braking system of FIG. 4.
Figure 10:
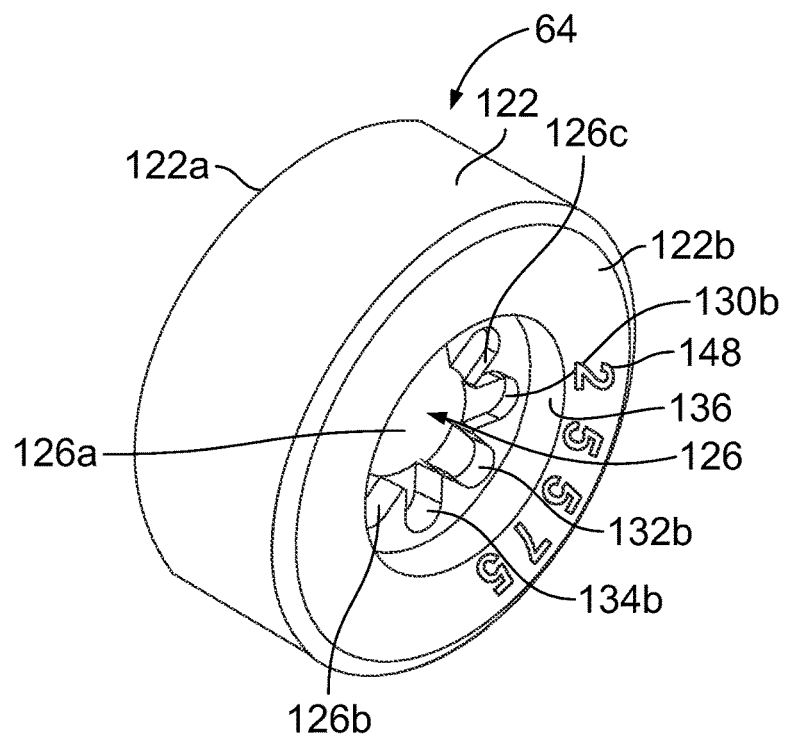
FIG. 10 is a perspective view of an adjustment knob of the braking system of FIG. 4.
Figure 11:
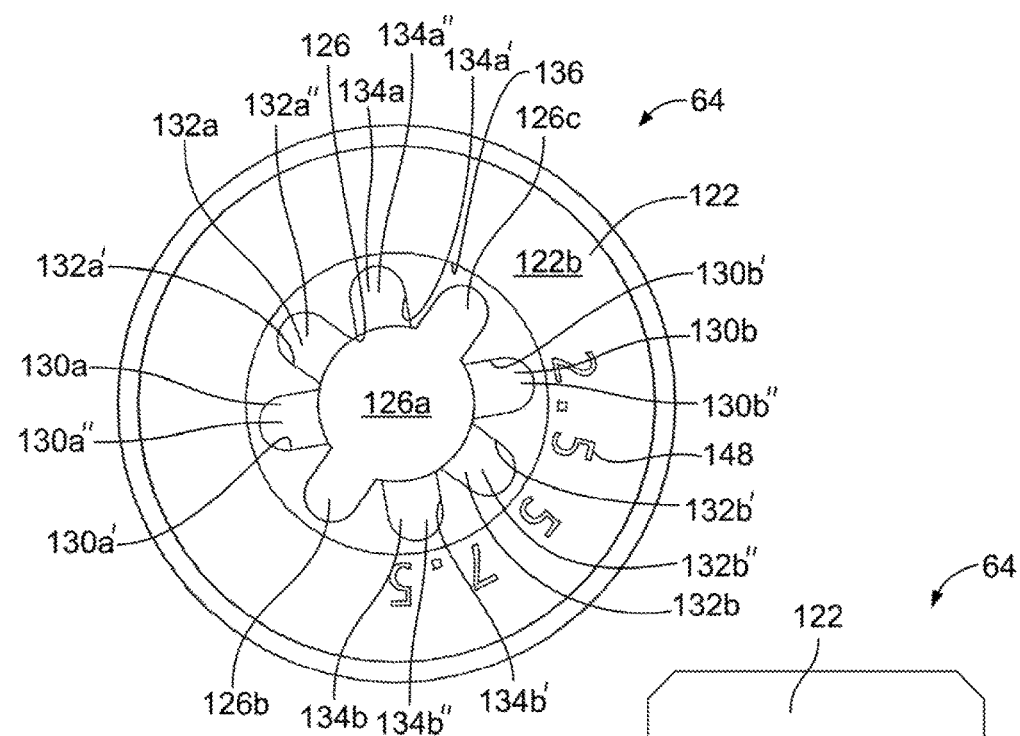
FIG. 11 is an end elevation view of the adjustment knob of FIG. 10.
Figure 12:
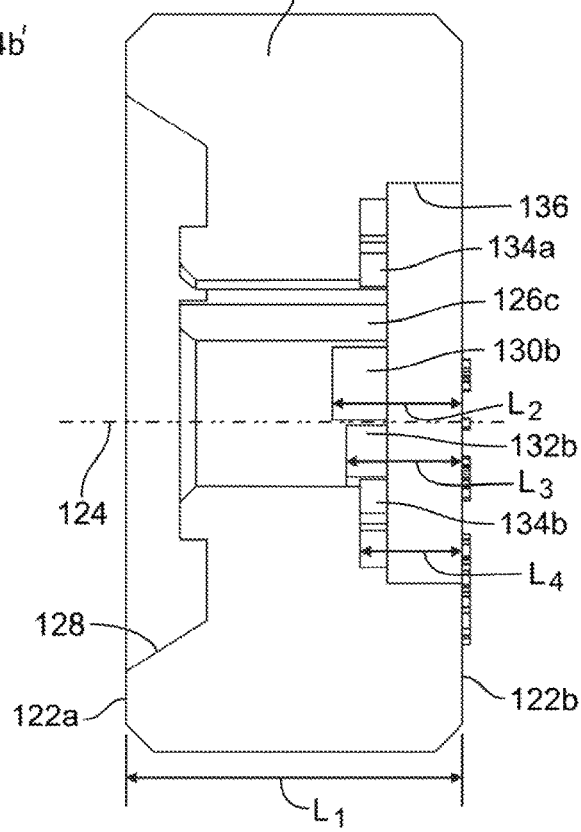
FIG. 12 is a cross-sectional view of the adjustment knob of FIG. 10.

FIG. 3 illustrates an exemplary wire-feed welding machine 30 that includes a quick change braking system 32 for a spool hub 34 which is used to a mount of spool of wire 22. The exemplary welding machine 30 includes a plurality of components disposed within a housing 38, including the braking system 32. In operation, a drive system 40 advances a wire electrode 42 from the housing 38 to a welding torch or gun 44. This wire electrode 42 is fed from the spool of wire 22 disposed within the housing 38. A power supply 46 provides operating power to a motor 48 of the drive system 40 to facilitate advancement of the wire electrode 42. The wire electrode 42 may be advanced through a supply cable 50 to a contact tip within a nozzle 52 of the welding torch or gun 44.

During a welding operation, placement of the nozzle 52 at a location proximate to a workpiece 54 allows electrical current provided by the power supply 46, which is routed to the welding torch or gun 44 via the supply cable 50, to arc from the welding torch or gun 44 to the workpiece 54. This arcing generates a relatively large amount of heat that causes the workpiece 54 and/or a filler metal to transition to a molten state, thereby facilitating the weld. As will be appreciated, such filler metal may be provided by the wire electrode 42 or from some other source.

The braking system 32 allows a user to quickly change the settings without the use of tools. The braking system 32 provides a plurality of preset brake forces to provide the proper braking force on the spool hub 34 to speed up or slow the rotation of the spool hub 34, and thus the spool of wire 22 mounted on the spool hub 34. The braking system 32 includes a spool hub shaft 56, a brake surface 58, a spool hub 34, a washer 60, a compressible and expandable member 62, an adjustment knob 64, a pin 66 and a spool hub nut 68.

The spool hub shaft 56 extends outwardly from a baffle 70 of the housing 38 and is non-rotatably mounted to the baffle 70. The baffle 70 may be formed of metal or plastic, or a combination of metal and plastic. The spool hub shaft 56 has first and second opposite ends 56a, 56b between which first, second and third unthreaded cylindrical portions 76, 78, 80 are provided. The first portion 76 extends from the baffle 70 and is non-rotatably connected to the baffle 70, the second portion 78 extends from the outer end of the first portion 76, and the third portion 80 extends from the outer end of the second portion 78 and terminates at end 56b which is free. The second portion 78 has a diameter which is less than the diameter of the first portion 76 such that a shoulder 82 is defined between the first and second portions 76, 78. The third portion 80 has a diameter which is less than the diameter of the second portion 78 such that a shoulder 84 is defined between the second and third portions 78, 80. The third portion 80 has a bore 81 therethrough which is perpendicular to a centerline 86 of the spool hub shaft 56. The free end 56b may have a chamfer formed thereon.

The brake surface 58 may be formed from a brake washer as shown in the drawings, or may be formed from a planar surface of the baffle 70 of the housing 38. If formed of a brake washer, the brake washer is non-rotatably mounted on the spool hub shaft 56 and is non-rotatably affixed to the baffle 70. The brake washer may be formed of plastic or metal, or a combination of metal and plastic. As shown, the brake washer is formed from a planar base wall 88 having first and second sides 88a, 88b, a side wall 90 depending from the first side of 88a the base wall 88 at the outer edge of the base wall 88 and which terminates in a free end 90a, and a pin 92 which extends outwardly from the first side 88a of the base wall 88. The pin 92 extends outwardly from the base wall 88 a greater distance than the side wall 90. A central aperture 94 is formed through the base wall 88. The first portion 76 of the spool hub shaft 56 seats within the central aperture 94 and the free end 90a of the side wall 90 abuts against the baffle 70. The pin 92 engages within a bore 96 in the baffle 70 to prevent the brake washer from rotating relative to the baffle 70.

The spool hub 34 is mounted on the spool hub shaft 56 and the first end 34a abuts against the second side 88b of the base wall 88 of the brake surface 58. The spool hub 34 is formed of a cylindrical body 98 having opposite first and second ends 98a, 98b, an arm 100 which extends radially outwardly from the body 98 at the first end 98a thereof, and a flange 102 which extends radially outwardly from the body 98 proximate to the first end 98a. The body 98 has a first unthreaded cylindrical portion 104 and a second threaded cylindrical portion 106. The arm 100 extends from the flange 102. A central passageway 108 extends through the body 98 and has a first section 108a which extends through the first portion 104 and a portion of the second portion 106, and a second section 108b which extends through the remainder of the second portion 106. The first section 108a has a diameter which is less than the diameter of the second section 108b such that a shoulder 110 is formed between the first and second sections 108a, 108b. The arm 100 includes a first part 100a which extends radially outwardly from the first portion 104 of the body 98 and a second part 100b which extends perpendicularly to the first part 100a and parallel to a centerline of the spool hub 34; the centerline of the spool hub 34 aligns with the centerline 84 of the spool hub shaft 56 when the spool hub 34 is mounted on the spool hub shaft 56 as discussed herein. The second part 100b extends toward the second end 98b of the body 98 and has a length which is greater than the distance between the first end 98a of the body 98 and the flange 102. The first portion 76 of the spool hub shaft 56 seats within the first section 108a of the passageway 108 and extends outwardly from the first end 98a of the body 98. The second portion 78 of the spool hub shaft 56 seats partially within the first section 108a and partially within the second section 108b of the passageway 108. The third portion 80 of the spool hub shaft 56 seats partially within the second section 108b and extends outwardly from the second end 98b of the body 98.

The washer 60 is conventional having circular ring 114 with a central aperture 116 therethrough. Both sides of the ring 114 are planar.

The compressible and expandable member 62 is formed from a central section 118 having opposite first and second ends 118a, 118b, and a central passageway 120 therethrough. The compressible and expandable member 62 has a length defined between the first and second ends 118a, 118b which is less than the length of the second and third portions 78, 80 of the spool hub shaft 56. The compressible and expandable member 62 may be formed from a coil spring or an elastomeric member, such as a rubber block.

The spool hub shaft 56 extends through the central aperture 116 of the washer 60 such that the washer 60 surrounds the second portion 78 of the spool hub shaft 56, and the washer 60 seats within the second section 108b of the passageway 108 and against the shoulder 110. The spool hub shaft 56 extends through the central passageway 120 of the compressible and expandable member 62. In an expanded condition, the member 62 surrounds the second portion 78 and a part of the third portion 80 of the spool hub shaft 56; the member 62 seats within the second section 108b of the passageway 108; the first end 118a of the member 62 seats against the washer 60 and the second end 118b of the member 62 seats against the adjustment knob 64 as described herein.

The adjustment knob 64 is formed from a body 122 having first and second opposite ends 122a, 122b and a centerline 124 extending therethrough, an unthreaded central passageway 126 extending through the body along the centerline 124, a counterbore 128 provided in the first end 122a of the body 122, and a plurality of mounting recesses 130a, 130b, 132a, 132b, 134a, 134b formed in the second end 122b of the body 122. The second end 122b of the body 122 may have a counterbore 136 formed therein and the mounting recesses 130a, 130b, 132a, 132b, 134a, 134b formed in the counterbore 136, or the counterbore 136 may be eliminated the mounting recesses 130a, 130b, 132a, 132b, 134a, 134b formed in the second end 122b of the body 122. The body 122 has a length $L_1$ defined between the first and second ends 122a, 122b which is less than the length of the third portion 80 of the spool hub shaft 56 such that the adjustment knob 64 can move along the length of the third portion 80 of the spool hub shaft 56 without falling off the spool hub shaft 56.

The central passageway 126 has a first central portion 126a which is cylindrical, a second portion 126b which extends radially outwardly from the centerline 124 of the body 122, and a third portion 126c which extends radially outwardly from the centerline 124 of the body 122 and is diametrically opposed to the second portion 126b. The first central portion 126a has substantially the same diameter as the third portion 80 of the spool hub shaft 56 and has a diameter which is less than the diameter of the second portion 78 of the spool hub shaft 56. The second and third portions 126b, 126c are each formed from a pair of side surfaces with an end surface connecting the side surfaces. The side surfaces may be straight and the end surfaces may be curved.

The mounting recesses 130a, 130b, 132a, 132b, 134a, 134b extend radially outwardly from the centerline 124 and radially outwardly from the first central portion 126a of the central passageway 126. Each mounting recess 130a, 130b, 132a, 132b, 134a, 134b is formed of a side wall 130a', 130b', 132a', 132b', 134a', 134b' which is parallel to the centerline 124 of the body 122, and a base wall 130a", 130b", 132a", 132b", 134a", 134b" which is perpendicular to the centerline 124 of the body 122. The side wall 130a', 130b', 132a', 132b', 134a', 134b' is formed from a pair of side surfaces with an end surface connecting the side surfaces. The side surfaces may be straight and the end surface may be curved. Mounting recesses 130a, 130b are diametrically opposed from each other and form the same recess; mounting recesses 132a, 132b are diametrically opposed from each other and form the same recess; mounting recesses 134a, 134b are diametrically opposed from each other and form the same recess. The side walls 130a', 130b' of mounting recesses 130a, 130b have the same length $L_2$ which is defined as the distance between the second end 122b of the body 122 and the base wall 130a", 130b". The side walls 132a', 132b' of mounting recesses 132a, 132b have the same length $L_3$ which is defined as the distance between the second end 122b of the body 122 and the base wall 132a", 132b". The side walls 134a', 134b' of mounting recesses 134a, 134b have the same length $L_4$ which is defined as the distance between the second end 122b of the body 122 and the base wall 134a", 134b". The lengths $L_2$, $L_3$ and $L_4$ are different from each other such that the mounting recesses 130a/130b, 132a/132b, 134a/134b have differing lengths. For example, length $L_2$ is greater than length $L_3$; length $L_3$ is greater than length $L_4$. As a result, the distance between the respective base walls 130a"/130b", 132a"/132b", 134a"/134b" and the first end 122a of the body 122 varies from mounting recess to mounting recess.

The pin 66 is conventional and may be formed of a cylinder or may have other shapes. The pin 66 is secured into the bore 81 of the spool hub shaft 56, for example by a press-fit, or the pin 66 may be integrally formed with the spool hub shaft 56 and the bore 81 eliminated. At least one end of the pin 66 extends radially outwardly from the spool hub shaft 56 to form a tab. As shown, two radially extending tabs 138a, 138b are provided for engaging into respective ones of the mounting recess 130a, 130b, 132a, 132b, 134a, 134b as described herein, however, it is to be understood that only a single tab is required.

The adjustment knob 64 is mounted onto the third portion 80 of the spool hub shaft 56 by passing the third portion 80 of the spool hub shaft 56 through the first central portion 126a of the central passageway 126 and the tabs 138a, 138b of the pin 66 through the second and third portions 126b, 126c of the passageway 126. The adjustment knob 64 partially seats within the second section 108b of the passageway 108 of the spool hub 34. The second end 118b of the member 62 seats within the counterbore 128 such that the member 62 is between the adjustment knob 64 and the spool hub 34. The third portion 80 of the spool hub shaft 56 extends outwardly from the second end 122b of the body 122.

To fix the position of the spool hub 34 relative to the brake surface 58, the tabs 138a, 138b are seated into one pair of the mounting recesses, for example mounting recesses 130a, 130b. This engagement of the tabs 138a, 138b into the mounting recesses 130a, 130b secures the adjustment knob 64, the member 62 and the spool hub 34 to the spool hub shaft 56 and thus to the welding machine 30, and causes the first end 34a of the spool hub 34 to abut against the second end 88b of the brake surface 58 with a predetermined amount of force.

The adjustment knob 64 is rotatable on the spool hub shaft 56 when the tabs 138a, 138b are not engaged within the mounting recesses 130a, 130b, 132a, 132b, 134a, 134b. The tabs 138a, 138b can be positioned outwardly from the second 122b end of the body 122 by pushing on the adjustment knob 64 to compress the member 62 to move the adjustment knob 64 toward the brake surface 58 such that the tabs 138a, 138b clear the mounting recesses 130a, 130b, 132a, 132b, 134a, 134b. Once the tabs 138a, 138b are clear, the adjustment knob 64 can be rotated to a new position and the tabs 138a, 138b engaged within a new pair of mounting recesses, for example mounting recesses 132a, 132b. The amount of movement of the adjustment knob 64 relative to the spool hub shaft 56 is limited by the length of the third portion 80.

The spool hub nut 68 is used to mount the spool of wire 22 on the spool hub 34. As is known in the art, the spool of wire 22 includes a core 140 having end flanges 142a, 142b extending radially outwardly from the ends of the core 140 and a central unthreaded passageway 144 through the core 140. The wire is wound onto the core 140 and held between the two flanges 142a, 142b. A bore (not shown) is provided in at least one of the flanges, for example flange 142a.

The spool hub nut 68 is formed from a body having first and second ends and a central threaded passageway 146 therethrough. The threads in the passageway 146 mates with the threads on the second portion 106 of the spool hub 34.

In use, the spool hub nut 68 is removed from the spool hub 34 and the spool of wire 22 is mounted onto the spool hub 34 by passing the spool hub 34 through the passageway 144 of the spool of wire 22 until the flange 142a abuts against the flange 102 on the spool hub 34. The second part 100b of the arm 100 engages into the bore in the flange 142a. As a result, the rotational position of the spool of wire 22 is fixed relative to the spool hub nut 68. At a least a part of the threaded portion 106 of the spool hub 34 extends outwardly from the spool of wire 22. The spool hub nut 68 is then threadedly engaged with the threaded portion 106 of the spool hub 34 until the spool hub nut 68 engages with the flange 142b of the spool of wire 22. The spool of wire 22 is then trapped between the spool hub 34 and the spool hub nut 68.

The spool of wire 22 and the spool hub 34 are rotated during use of the welding machine 30 to feed wire to the welding components of the welding machine 30. As the spool hub 34 rotates, the engagement between the spool hub 34 and the brake surface 58 provides a braking action on the rotation.

The level of braking can be changed by rotating the adjustment knob 64 to different positions and placing the tabs 138a, 138b into the different pairs of mounting recesses 130a, 130b, 132a, 132b, 134a, 134b, which thus changes the compression force exerted on the spool hub 34 by the member 62, and thus the spool of wire 22, by the brake surface 58. When the tabs 138a, 138b are placed in mounting recesses 134a, 134b, the member 62 is slightly compressed between the adjustment knob 64 and the spool hub 34 and pushes the spool hub 34 into engagement with the brake surface 58. This results in a first predetermined level of pressure exerted by the member 62 on the spool hub 34, which pushes the spool hub 34 against the brake surface 58 with this first predetermined level of pressure. When the tabs 138a, 138b are placed in mounting recesses 132a, 132b, the member 62 is more compressed between the adjustment knob 64 and the spool hub 34 than when the tabs 138a, 138b are in mounting recesses 134a, 134b as a result of length $L_3$ being greater than length $L_4$. This results in a second predetermined level of pressure exerted by the member 62 on the spool hub 34, which pushes the spool hub 34 against the brake surface 58 with this second predetermined level of pressure. When the tabs 138a, 138b are placed in mounting recesses 130a, 130b, the member 62 is even further compressed between the adjustment knob 64 and the spool hub 34 than when the tabs 138a, 138b are in mounting recesses 132a, 132b. This results in a third predetermined level of pressure exerted by the member 62 on the spool hub 34 as a result of length $L_2$ being greater than length $L_3$, which pushes the spool hub 34 against the brake surface 58 with this third predetermined level of pressure. As a result, different levels of braking are placed on the spool hub 34 by the engagement between the first end 98a of the spool hub 34 and the second end 88b of the brake surface 58 as a result of the level of pressure placed on the spool hub 34 by the member 62.

The change in braking force can be easily changed between the predefined positions by a user without the use of tools. To do so, the user grips the adjustment knob 64 and pushed the adjustment knob 64 toward the brake surface 58 to compress the member 62 and disengage the tabs 138a, 138b from the mounting recesses, for example mounting recesses 130a, 130b, in which it is mounted. The adjustment knob 64 is then rotated to align the tabs 138a, 138b with the new desired mounting recesses, for example mounting recesses 134a, 134b. The adjustment knob 64 is then released to allow the member 62 to expand and reseat the tabs 138a, 138b into the new mounting recesses. This changes the amount of pressure exerted by the member 62 on the spool hub 34 and the level of engagement of the spool hub 34 with the brake surface 58.

The preset mounting recesses 130a, 130b, 132a, 132b, 134a, 134b in the braking system 32 may be designed to correlate to different spools of wire, such as aluminum, stainless steel, flux core, and mild steel. The braking system 32 prevents the end user from placing too much brake force on the spool hub 34, which in turn would prevent the spool hub 34 from spinning. The braking system 32 also prevents the user from not applying enough tension which could allow the spool of wire 22 to overspool.

This differing lengths provided by the mounting recesses 130a, 130b, 132a, 132b, 134a, 134b in the adjustment knob 64 results in differing lengths of the member 62 and differing forces generated by the member 62. These lengths can be correlated to different types of spools of wire 22, i.e. aluminum, stainless, etc., or can be correlated to spool size, i.e. four inch, eight inch, twelve inch. For example, an eight inch spool of aluminum takes much less braking force to prevent overspooling than a twelve inch spool of stainless wire. The adjustment knob 64 allows the user to change these parameters in a quick fashion without the use of tools.

While three pairs of mounting recesses 130a, 130b, 132a, 132b, 134a, 134b are shown in the drawings and described herein, it is to be understood that there could be more settings available based on changing the geometry of the surfaces in which the tabs 138a, 138b engage. Also, while two tabs 138a, 138b are provided, a single tab, for example tab 138a could instead be provided.

The adjustment knob 64 can be marked with indicia 148. As shown, indicia 148 relating to preset forces applied by the member 62 is provided. Other options for the indicia 148 include, but are not limited to, A, B, C; 1, 2, 3; or AL, STL, FLX to show what type of wire is being fed. Another option for the indicia 148 include, but are not limited to, 4, 8, 12 to represent the size of the spool of wire 22 in inches or millimeters. Yet another option for the indicia 148 include, but are not limited to, rough weight of spool 1, 10, 40 lbs. or metric ratings.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A braking system comprising:
   a brake surface;
   a spool hub shaft non-rotatably mounted to said brake surface, said spool hub shaft having a length and having at least one tab extending from said spool hub shaft;
   a spool hub coupled to the spool hub shaft and configured to rotate about said spool hub shaft, the spool hub engaging against the brake surface;
   an adjustment knob having a passageway therethrough, said spool hub shaft extending through said passageway of said adjustment knob to mount said adjustment knob on said spool hub shaft, said adjustment knob having a plurality of recesses configured to selectively receive said at least one tab; and
   a compressible and expandable member mounted on said spool hub shaft, said member having a first end engaging with said spool hub and a second end engaging with said adjustment knob.

2. The braking system of claim 1, wherein each said recess has a length defined between an end of said adjustment knob and a base of said recess, said plurality of recesses having differing lengths.

3. The braking system of claim 1, wherein each said recess has first and second parts which are diametrically opposed from each other.

4. The braking system of claim 1, wherein at least three recesses are provided.

5. The braking system of claim 1, further comprising a spool hub nut threadedly mounted on said spool hub.

6. The braking system of claim 1, wherein said brake surface is formed by a brake washer formed of plastic.

7. The braking system of claim 1, wherein said brake surface is formed by a brake washer formed of metal.

8. The braking system of claim 1, wherein said at least one tab is integrally formed with said spool hub shaft.

9. The braking system of claim 1, wherein a pin attached to said spool hub shaft forms said at least one tab.

10. The braking system of claim 1, wherein said compressible and expandable member is formed by a spring.

11. A welding machine comprising:
    a housing; and a braking system disposed within the housing, said braking system comprising:
a brake surface,
a spool hub shaft non-rotatably mounted to said housing, said spool hub shaft having a length and having at least one tab extending from said spool hub shaft,
a spool hub coupled to the spool hub shaft and configured to rotate about said spool hub shaft, the spool hub engaging against the brake surface,
an adjustment knob having a passageway therethrough, said spool hub shaft extending through said passageway of said adjustment knob to mount said adjustment knob on said spool hub shaft, said adjustment knob having a plurality of recesses configured to selectively receive said at least one tab, and
a compressible and expandable member mounted on said spool hub shaft, said member having a first end engaging with said spool hub and a second end engaging with said adjustment knob.

12. The welding machine of claim 11, wherein each said recess has a length defined between an end of said adjustment knob and a base of said recess, said plurality of recesses having differing lengths.

13. The welding machine of claim 12, wherein each said recess has first and second parts which are diametrically opposed from each other.

14. The welding machine of claim 11, further comprising a spool hub nut threadedly mounted on said spool hub.

15. The welding machine of claim 11, wherein said brake surface is formed by a brake washer which is non-rotatably mounted on said housing.

16. The welding machine of claim 15, wherein said brake washer is formed of plastic.

17. The welding machine of claim 11, wherein said brake surface is formed by a portion of the housing.

18. The welding machine of claim 11, wherein said at least one tab is integrally formed with said spool hub shaft.

19. The welding machine of claim 11, wherein a pin attached to said spool hub shaft forms said at least one tab.

20. The welding machine of claim 11, wherein said compressible and expandable member is formed by a spring.

* * * * *